United States Patent [19]

Alger et al.

[11] Patent Number: 5,913,217

[45] Date of Patent: Jun. 15, 1999

[54] GENERATING AND COMPRESSING UNIVERSALLY UNIQUE IDENTIFIERS (UUIDS) USING COUNTER HAVING HIGH-ORDER BIT TO LOW-ORDER BIT

[75] Inventors: Jeffrey H. Alger, Redmond; John G. Bennett, Bellevue; David A. Marshall, Redmond; David R. Shutt, Bellevue, all of Wash.

[73] Assignee: Microsoft Corporation, Redmond, Wash.

[21] Appl. No.: 08/885,115

[22] Filed: Jun. 30, 1997

[51] Int. Cl.$^6$ .................................................. G06F 17/30

[52] U.S. Cl. .............................. 707/101; 707/1; 707/10; 707/200

[58] Field of Search ...................... 707/1, 2, 101, 707/102, 6, 10, 103, 104, 100, 200, 205; 395/468, 200.33, 200.31, 200.54, 200.58; 365/356; 711/148, 171, 170

[56] References Cited

U.S. PATENT DOCUMENTS

| | | | |
|---|---|---|---|
| 5,423,043 | 6/1995 | Fitzpatrick et al. | 395/683 |
| 5,497,463 | 3/1996 | Stein et al. | 395/200.33 |
| 5,731,814 | 3/1998 | Bala | 345/356 |

OTHER PUBLICATIONS

Bell, Timothy et al., *Text Compression*, Prentice–Hall, New Jersey, U.S.A., 1990, pp. v–xi, pp. 1–27, and pp. 206–243.
Brockschmidt, Kraig, *Inside Ole*, Microsoft Corporation, Redmond, U.S.A., 1995, pp. iv–xviii and pp. 61–143.
Williams, Ross N., *Adaptive Data Compression*, Kluwer Academic Publishers, Massachusetts, U.S.A., 1991, pp. vi–x and pp. 1–105.
http://wfd.webflow.buffalo.edu/online–doc/dce1.1/app_gd core_13.html. [Accessed May 10, 1998] [1–10 pages]12. RPC Fundamentals.
http://www.opengroup.org/onlinepubs/9629399/apdxa.htm. [Accessed May 10, 1998] DEC 1.1:Remote Procedure Call [1–5 pages].
http://www.rs6000.ibm.com/resource/aix resource/Pubs/ redbooks/htmlbooks/sg244616.00/461ch3.html. [Accessed Jun. 30, 1998] [27 pages] Understanding OSF DEC 1.1.
Timothy C. Bell et al., Text Compression, Prentice Hall, 1990 and chap 1, p. 26 1990.

*Primary Examiner*—Wayne Amsbury
*Assistant Examiner*—Srirama Channavajjala
*Attorney, Agent, or Firm*—Seed and Berry LLP

[57] ABSTRACT

A computer-based method and system for generating and compressing a plurality of universally unique identifiers (UUIDs). The bits of the UUIDs are ordered from left to right. The system maintains a counter with bits ordered from a high-order bit to a low-order bit. To generate a UUID, the system increments the counter. The system then sets the right-most bits of the UUID to a node identifier, sets the next right-most bits of the UUID to a clock sequential/variant value, and sets the left-most bits of the UUID to the bits of the counter wherein the left-most bit of the UUID is set to the lowest-order bit of the counter so that sequentially generated UUIDs tend to have the same values in their right-most bits. The system then compresses these UUIDs using a suffix compression technique.

64 Claims, 12 Drawing Sheets

GENERATING AND COMPRESSING UNIVERSALLY UNIQUE IDENTIFIERS (UUIDS) USING COUNTER HAVING HIGH-ORDER BIT TO LOW-ORDER BIT

TECHNICAL FIELD

This invention is related generally to storing universally unique identifiers, and more particularly to compressing the universally unique identifiers.

BACKGROUND OF THE INVENTION

Computer systems generate and store vast amounts of information. This information is generally persistently stored on storage devices, such as computer disks. A collection of such information is often referred to as an "object." Since a storage device may contain many objects, each stored object is assigned a unique identifier. When an object is to be retrieved from the storage device, the unique identifier is used to identify the object to be retrieved. For example, an object (i.e., a file) that is created by a file system is given a unique filename as its identifier. To subsequently access the object, a computer program provides the filename to file system. The file system uses this filename to identify and locate the object on the storage device.

Although a computer system can generate identifiers (e.g., filenames) that are unique among the objects that it creates, such identifiers, however, may not be unique when other computer systems are considered. In particular, another computer system may generate the same identifiers for its objects. For example, two computer systems may have objects named "autoexec.bat," which contain very different information. Thus, the filename "autoexec.bat" does not uniquely identify one object. Rather, it identifies two objects on two different computer systems. This, of course, is not a problem if each computer system only uses the objects that it creates. This, however, can be a problem if computer systems are networked together and another computer system asks to retrieve the object identified as "autoexec.bat." The identifier "autoexec.bat" does not uniquely identify which object should be retrieved.

These objects could be uniquely identified by both a unique identification of the computer system and a unique identifier of the object within that computer system. A couple of problems, however, have arisen with such an approach. There is no standardized mechanism for assigning a unique identifier to the computer systems themselves. Thus, two computer systems may have the same identifier. As a result, the combination of the computer system identifier and the object identifier still may not be unique. Moreover, even within a single computer system, the object identifiers may not actually be unique. If the computer system has various computer programs, then each computer program may generate identifiers for objects, especially for objects that are not stored by the file system, that are not unique.

To solve these problems, the Open Software Foundation (OSF) created the Universally Unique Identifier (UUID). The UUID is a 128-bit value that is defined so that the chance of two computer systems generating a UUID with the same 128-bit value would be extremely small. FIG. 1 illustrates the format as defined by the OSF of the UUID. The UUID 110 contains three fields: a 48-bit node ID field 120, a 16-bit clock sequential/variant field 130, and a 64-bit clock/version field 140. The node ID field comprises bits 0–47; the clock sequential/variant field comprises bits 48–63; and the clock/version field comprises bits 64–127.

The node ID field contains a node identifier that uniquely identifies the computer system that created the UUID. By convention, manufacturers of network access cards assign a 48-bit unique identifier to each network access card that they create. Consequently, if a computer system has a network access card, then the node ID field is set to the value of that network access card identifier. However, if a computer system does not have a network access card, then the computer system randomly generates a value that it uses as its unique identifier and sets the node ID field to that value. Because of the large size (48 bits) of the node ID field, the probability that a computer system will randomly generate the same identifier of that of another computer system is extremely small. If a computer system did randomly generate the same identifier as that of another computer system, since the computer system that randomly generated the identifier has no network access card, it was originally expected to be unlikely that the resulting duplicate UUID would be used by any computer system other than the one that created the UUID.

The clock/version field is divided into a 60-bit clock subfield and a 4-bit version subfield. The clock represents time since Oct. 15, 1582 (beginning of the Gregorian calendar usage) in increments of 100 nanoseconds. The 60-bit clock subfield is further divided into a 32-bit low part 141, a 16-bit medium part 142, and a 12-bit high part 143. The 12-bit high part is further divided into an 8-bit low subpart 143a and a 4-bit high subpart 143b. The 60 bits of the computer system clock 150 are stored in the clock subfield in the following way. Bits 0–31 of the system clock are stored in the low part (bits 96–127). Bits 32–47 of the system clock are stored in the medium part (bits 80–95). Bits 48–55 of the system clock are stored in the low subpart (bits 72–79) of the high part, and bits 56–59 of the system clock are stored in the high subpart (bits 64–67) of the high part.

The clock sequential/variant field is subdivided into a 12- or 13-bit clock sequential subfield and a 3- or 4-bit variant subfield. The variant subfield is a 3- or 4-bit, zero-terminated subfield that identifies the format of the universally unique identifier. One format is the OSF-defined format. The use of a different value in the variant field for each format ensures that a UUID in one format will not be a duplicate of a UUID in another format. The clock sequential subfield is used to ensure uniqueness of the UUID in the event that a computer system generates two UUIDs with the same value in the clock/version field. Thus, whenever there is a possibility that the clock for the computer system may generate a duplicate time, then the clock sequential subfield is incremented. For example, when a clock is set back an hour to account for the transition from standard time to daylight savings time, the clock will generate the same time that was generated an hour earlier. Thus, there is a possibility that the clock/version subfield of two UUIDs generated an hour apart would have the same value. Consequently, the clock sequential subfield is incremented when the clock is set back to ensure that the combination of the clock subfield and clock sequential subfield will be unique at all times at each computer system.

Although because of its definition there is an extremely small chance that duplicate UUIDs will be generated, there are several instances in which these chances are greatly increased. First, if a computer system has multiple processors, then there may be a possibility that duplicate UUIDs may be generated by two processors at the same time. In particular, assuming that the processors share the same network access card and thus have the same node identifier, then there is a possibility, albeit small, that two processors may generate a UUID at exactly the same time.

To prevent the generating of duplicate UUIDs, such multiple processor systems use a centralized allocator for generating UUIDs. When a processor needs to generate a new UUID, the processor requests the UUID from a central allocator that is shared by all processors. The central allocator generates a UUID and returns it to the processor. Because the UUIDs are sequentially generated by the central allocator at one processor, there is no chance of a duplicate UUID being created for this computer system. However, the overhead of requesting a UUID from a central allocator each time a new UUID is needed may be unacceptable. Consequently, each processor may request a range (e.g., 256) of UUIDs from the central allocator with each request. The central allocator returns a UUID with the low-order bits of the clock subfield set to 0. The requesting processor can then assign the UUIDs from the range to its objects by incrementing the clock subfield value once for each UUID. FIG. 2 illustrates the allocation of ranges of UUIDs. A local UUID generator 202 at one processor may request a range of 256 of UUIDs from the central UUID allocator 201. The central UUID allocator then allocates 256 UUIDs for that processor. The local UUID generator then generates UUIDs from that range. If, however, a local UUID generator 203 for another processor requests 256 UUIDs, the central UUID allocator may not be able to allocate the UUIDs immediately. In particular, because the UUIDs are clock-based, the central UUID allocator should wait for at least 256×100 nanoseconds to pass before allocating the next UUID range to the other local UUID generator. It would be desirable to avoid this waiting.

Second, the chance of generating duplicate UUIDs has increased recently because many computers, especially home personal computers, do not have network access cards. Consequently, each such computer would randomly generate its own node identifier. Of course, the more computers that randomly generate a node identifier, the greater the possibility of duplicate node identifiers being generated. In addition, since these computers are being increasingly interconnected via the Internet, the possibility that duplicate UUIDs will cause problems also increases.

The large size, 128 bits, of the UUID may be problematic in certain situations. For example, each row of a table in a database may be an object that is assigned its own UUID. Such rows may average 100 bytes of information. Since a UUID is 16 bytes in length, there would be a 16% storage overhead in storing a UUID along with each row in the table. FIG. 3 illustrates the overhead of UUIDs in a database table. The table 320 contains a UUID column 321 and data column 322. Each row 323 contains a UUID and data. The large size of the UUID also results in very large indexes into the table. The index 310, which is used to rapidly locate a row with a given UuID, contains an entry for each row in table 320. Each entry of the index contains a copy of the UUID that is in a row and row identifier (RID) that points to the corresponding row in table 320. Because each UUID is thus stored twice, there is a 32% storage overhead associated with UUIDs in such situations. It would be desirable to reduce this overhead.

SUMMARY OF THE INVENTION

The present invention provides a computer-based method and system that reduces the overhead of storing object identifiers and reduces the chance of duplicate object identifiers being generated. The system generates counter-based identifiers rather than OSF-defined identifiers. To generate an identifier, the system increments a counter having bits that are ordered from a high-order bit to a low-order bit. The system sets a computer system identifier portion of contiguous bits of the identifier to identify the computer system that is generating the identifier. The system also sets a counter portion of contiguous bits of the identifier to the bits of the incremented counter. The system sets the bits of counter portion so that the bits of the counter portion that are closer to the bits of the computer system identifier portion are set to the higher-order bits of the counter. The counter-based object identifier has the advantage of being more efficiently compressed than the OSF-defined format. For example, since the high-order bits of the counter portion are closer to the node identifier portion, for object identifiers generated at the same computer system, the amount of contiguous information in two object identifiers that is redundant is increased. Compression techniques can reduce storage overhead by efficiently storing the redundant information.

The system compresses a list of universally unique identifiers (UUIDs) by compactly representing redundant portions of the UUIDs. The system determines which portion of a selected UUID is redundant with a portion of a previously selected UUID. The system compresses a UUID by storing an indication of the portion of the selected UUID that is redundant and storing a remainder of the selected UUID that is not indicated as being redundant. When the redundant portions are contiguous and form either the prefix or the suffix of the UUIDs, one of many well known prefix or suffix compression algorithms can be used.

In another aspect of the present invention, the system compresses an object identifier by replacing a portion of the identifier with a short handle that specifies the bit that it replaces. The system generates a mapping of handles to values of a portion of object identifiers. To compress an object identifier, the system determines whether the value corresponding to the portion of the object identifier is in the generated mapping. When the value corresponding to the portion of the object identifier is in the generated mapping, the system sets a compressed form of the object identifier to a combination of the handle that maps to that value and of the remainder of the object identifier other than the value. To decompress a compressed object identifier, the system uses the handle to retrieve the bits for the portion from the mapping and adds the remainder.

DETAILED DESCRIPTION OF THE INVENTION

Figure 1:
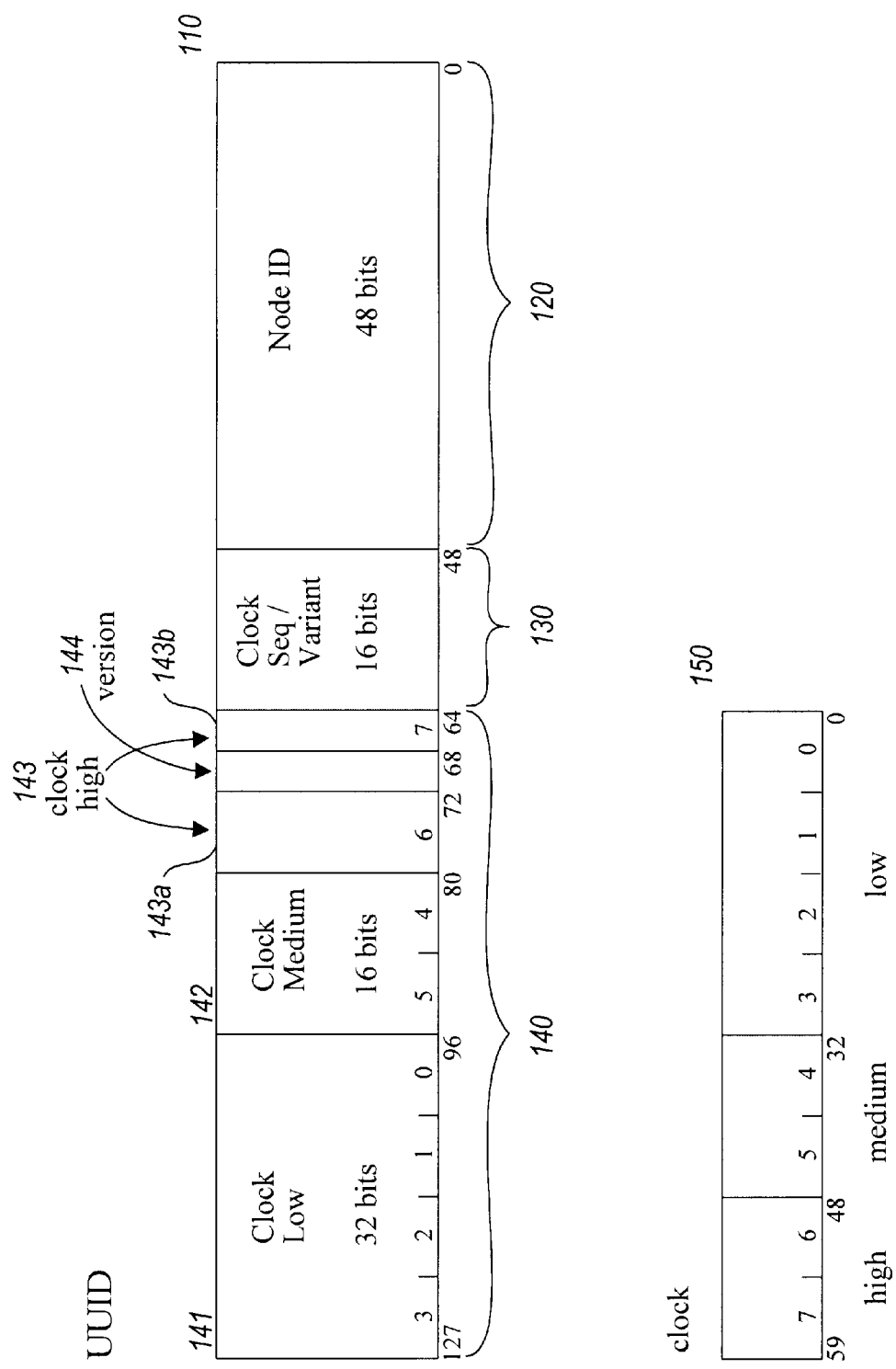
FIG. 1 illustrates the format of the UUID.
Figure 2:
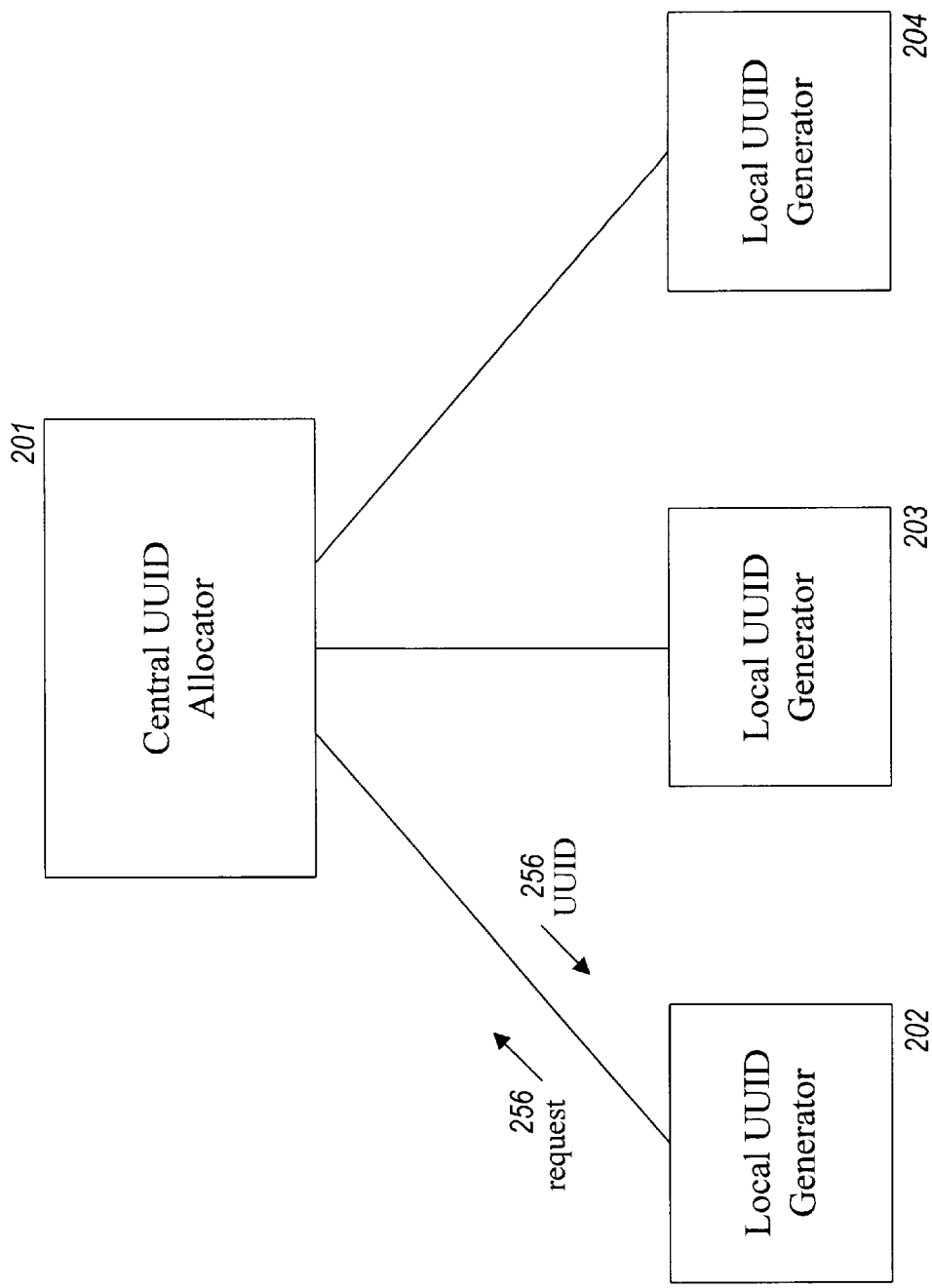
FIG. 2 illustrates the allocation of ranges of UUIDs.

The present invention provides compression methods and systems for reducing the amount of storage needed to store Universally Unique Identifiers (UUIDs). In one aspect of the invention, the compression system redefines the clock/version field of a UUID to be a counter field. The counter field represents a count of the number of UUIDs that have been generated for each unique combination of the node ID field and clock sequence/variant field of the UUID. Since many UUIDs generated at a single computer system will tend to have the higher-order bits of their counter fields equal, UUIDs with such a counter field will have redundant information in the node ID field, clock sequence/variant field, and in most of the higher-order bits of the counter field. Thus, in a list of UUIDs, such redundant information can be compactly represented using various well-known compression algorithms. In addition, the counter field preferably has all its bits arranged in order with its high-order bits to the right. Thus, the higher-order bits of the counter field are adjacent to the node ID field and the clock sequential/variant field, this redundant information will be in contiguous bits of the UUID. Thus, such an arrangement is particularly well suited to a suffix compression algorithm, which in a list of UUIDs represents the right-most bits of a UUID that are the same as the right-most bits in a previous UUID with a count of the bits that are the same. For example, since any UUID can have at most 127 bits that are the same, a 7-bit value can be used to represent the length. If the average count is 103 for a list of UUIDs, then the average number of bits needed to represent a UUID would be 32 bits (25 bits that are not redundant and 7 bits for the count), rather than 128 bits. Thus, the compression ratio would be 4-to-1 (128-to-32). One skilled in the art would appreciate that such suffix compression could also be used with UUDs that have the clock/version field as defined by the OSF format. However, the compression ratio would typically be less because the low-order bytes which would tend to change rapidly within a clock subfield are to the right of the high-order bytes. Thus, the count of contiguous bits that are the same would typically be less than if the high-order bytes were to the right.

In another aspect of the invention, the system compresses UUIDs by replacing a portion of UUIDs by a short handle into a UUID handle table. The UUID handle table maps each handle to the bits from that portion. If multiple UUIDs have the same bit values for that portion, then those bit values need only be stored in the UUID handle table once. For example, if bits 0–95 are considered the portion, then the UUID handle table will contain entries with 96 bits. If the UUID handle table has 256 entries, then the handle can be represented by 8 bits. Thus, each UUID can be represented by 48 bits, bits 96–127 along with the 8-bit handle. Such a representation would result in a savings of 11 bytes per UUID, not including the space needed by the UUID handle table. The UUIDs are uncompressed by combining the bits 96–127 of the compressed UUID with bits 0–95 that are retrieved from the UUID handle table using the 8-bit handle.

In another aspect of the present invention, the compression system can rearrange the bits of the clock/version field of the OSF-defined UUID when stored to improve the contiguity of redundant bit values. With contiguity improved, a suffix compression algorithm would achieve better compression even with the OSF-defined format. For example, the bits of the high subpart of the high clock part of the clock subfield can be rearranged so that the high-order bits are to the right of the low-order bit. Thus, the position of bits 64–67 would be reversed so that the bit value of bit 64 would be set to the previous bit value of bit 67. The rearranged UUID would be arranged back when sending the UUID to another computer system. Alternatively, one would appreciate that the count s of redundant bits does not necessarily represent contiguous bits. That is, a count of 87 could represent bits 0–63 of the UUID, bits 68–71, bits 67–64, bits 79–72, and bits 87–80, in that order. Thus, these bits could be considered as logically rearranged, rather than actually rearranged.

Figure 4:
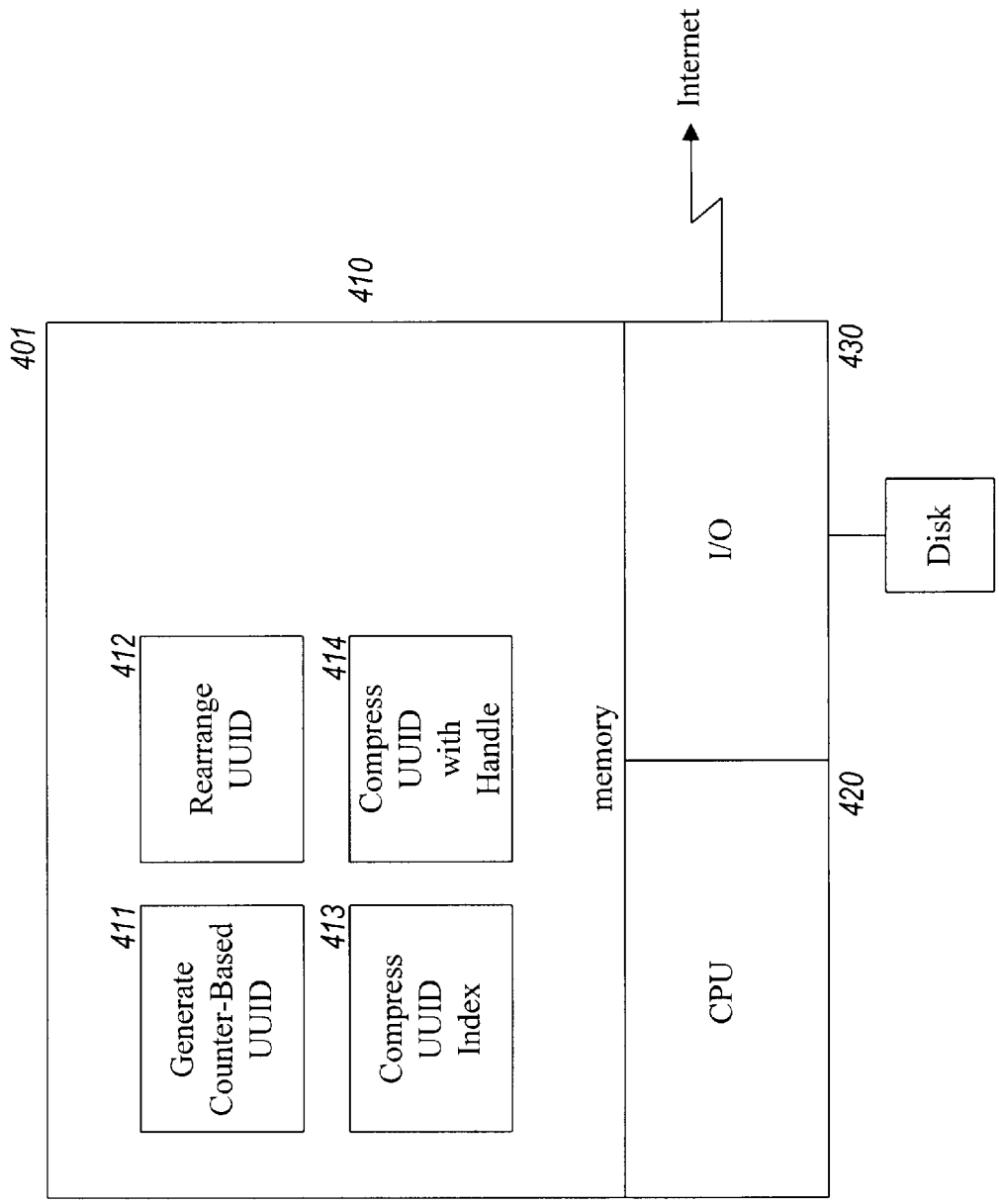
FIG. 4 is a block diagram of a computer system for practicing a UUID compression system.

FIG. 4 is a block diagram of a computer system for practicing the compression system. The computer system includes a memory 410, a central processing unit 420, and an input/output interface 430. One skilled in the art would appreciate that the present invention can be practiced on computer systems with various other architectures. The compression system contains a component 411 to generate a counter-based UUID, a component 412 to rearrange a UUID to improve contiguity of redundant portions, a component 413 to compress an index of UUIDs, and a component 414 to compress a UUID using handles.

Figure 5:
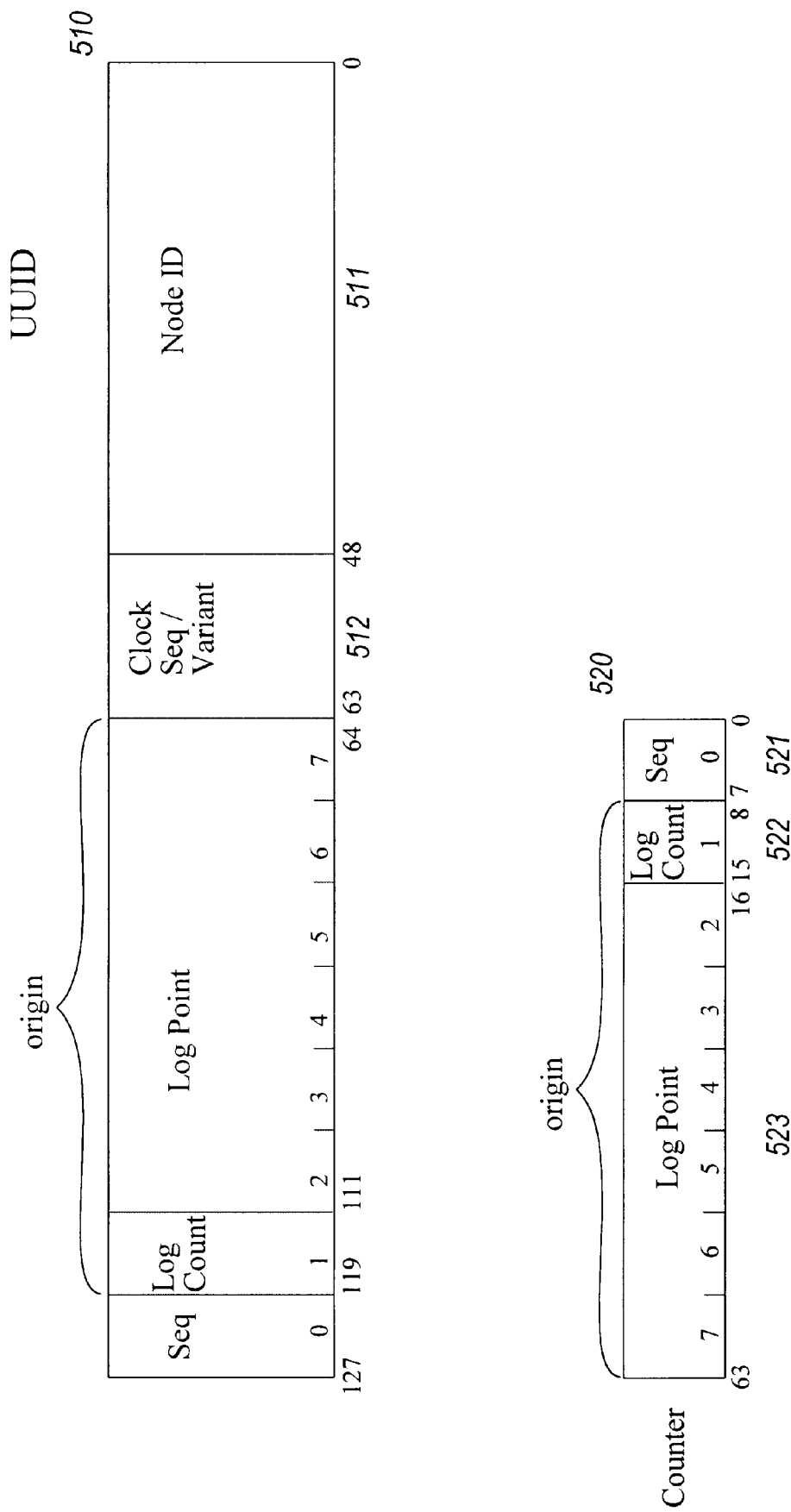
FIG. 5 is a block diagram illustrating the generation of a counter-based UUID.

FIG. 5 is a block diagram illustrating the generation of a counter-based UUID. The UUID 510 contains the node ID field 511 and the clock sequential/variant field 512 in the right-most 64 bits, bits 0–63. The left-most 64 bits, bits 64–127, contain the counter field, with the low-order bits of the counter being stored in the left-most bits of the UUID. The actual counter 520, which contains the count of the number of UUIDs generated for the current clock sequential subfield value, contains 64 bits. This actual counter is incremented once for each UUTD that is generated. The actual counter has a typical bit-ordering with the low-order bits to the right. The low-order 8 bits represent a sequence subfield and the high-order 56 bits represent an origin subfield, which are used when allocating UUIDs from a central UUID allocator. Whenever a central UUID allocator is requested to allocate a range of these counter-based UUIDs, the central UUID allocator allocates a counter-based UUID with the node ID field set to the node identifier, the clock sequential/variant field set to its current value, and the counter field set to the actual counter with the bit ordering reversed and with its sequence subfield set to zero. The central UUID allocator then increments its actual counter by 256. The local UUID generator then generates IJUIDs by incrementing the sequence subfield. Thus, a local UUID generator is allocated a range of 256 UUIDs at a time. When the local UUID generator generates all the allocated UUIDs, it then requests the central UUID allocator to allocate another range of UUID. One skilled in the art would appreciate that the number of bits in the sequence subfield could be changed to allow for the allocation of larger or smaller ranges of counter-based UUIDs at a time.

As discussed above, with the OSF-defined UUID, the clock sequential subfield of the clock sequential/variant field is changed to a new value whenever the uniqueness of the clock subfield cannot be guaranteed. However, if the clock sequential subfield is changed, then newly generated UUIDs will have shorter suffixes that are redundant with the previously generated UUIDs. To avoid these shorter redundant suffixes, the compression system divides the origin subfield into an 8-bit log count part and a 48-bit log point part. Whenever the actual counter is incremented so that the log point part is changed (ie., every $2^{16}$ increments), the value of the log point part is stored persistently on a storage device. Thus, if for some reason (e.g., system wash) the actual counter in memory is corrupted, the compression system can reset the actual counter based on the stored log point part. For example, if the last log point part persistently stored has a value of 5, then when the system is restarted, the system retrieves the log point part of 5, increments it, stores it in the log point part of the actual counter, and sets the other bits of the actual counter to zero. In this way, uniqueness of UUIDs generated by a computer system is guaranteed without having to modify the clock sequence subfield, and the length of contiguous, redundant information is improved. The length of the log count and log point parts can be varied to affect frequency at which the log point is persistently stored. This also affects how many UUIDs would be skipped due to resetting the actual count. For example, with an 8-bit log count (and 8-bit sequence subfield), if the compression system persistently stored the log point and the system crashed before the next UUID was generated, then $2^{16}$ UUIDs would be skipped. These UUIDs are skipped because when the compression system is next started it will increment the next log point. Thus, no UUIDs would ever be generated for that persistently stored log point. Moreover, the clock sequential subfield is thus free to be considered an extension of the node ID field to greatly reduce the chance of generating duplicate node identifiers.

If the counter-based UUID format is assigned a unique variant value, then it can be assured that no counter-based UUID will be a duplicate of a UUID in any other format. Alternatively, if a unique variant value is not assigned to the counter-based UUIDs, then the counter values could be limited to a range that represents a clock value for which no OSF-defined UUID could have been generated. For example, the counter values could be limited to clock values corresponding to years before 1900. Since no OSF-defined UUID could have a clock value before the year 1900, uniqueness would be assured.

Figure 3:
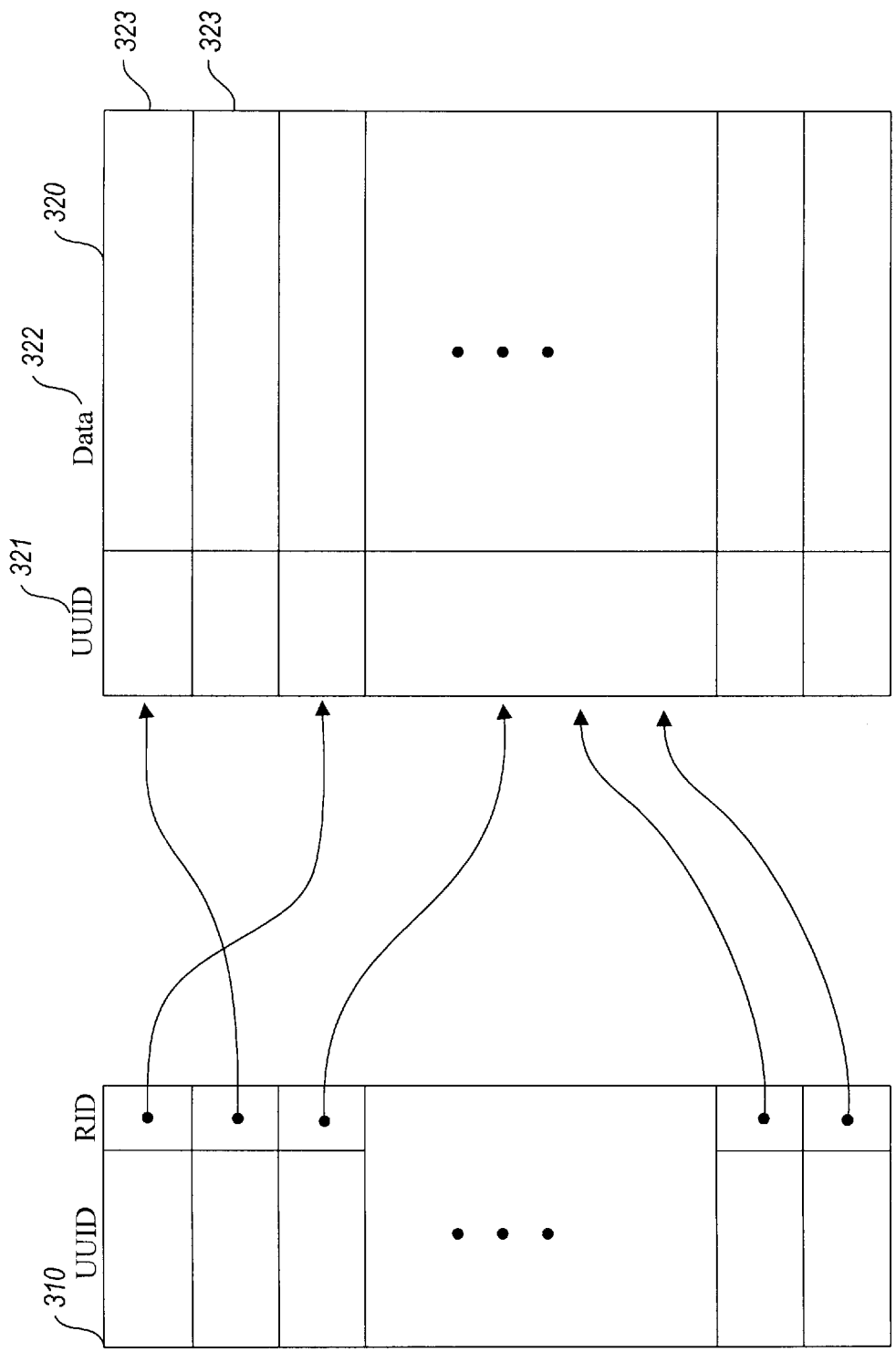
FIG. 3 illustrates the overhead of UUIDs in a database table.
Figure 6:
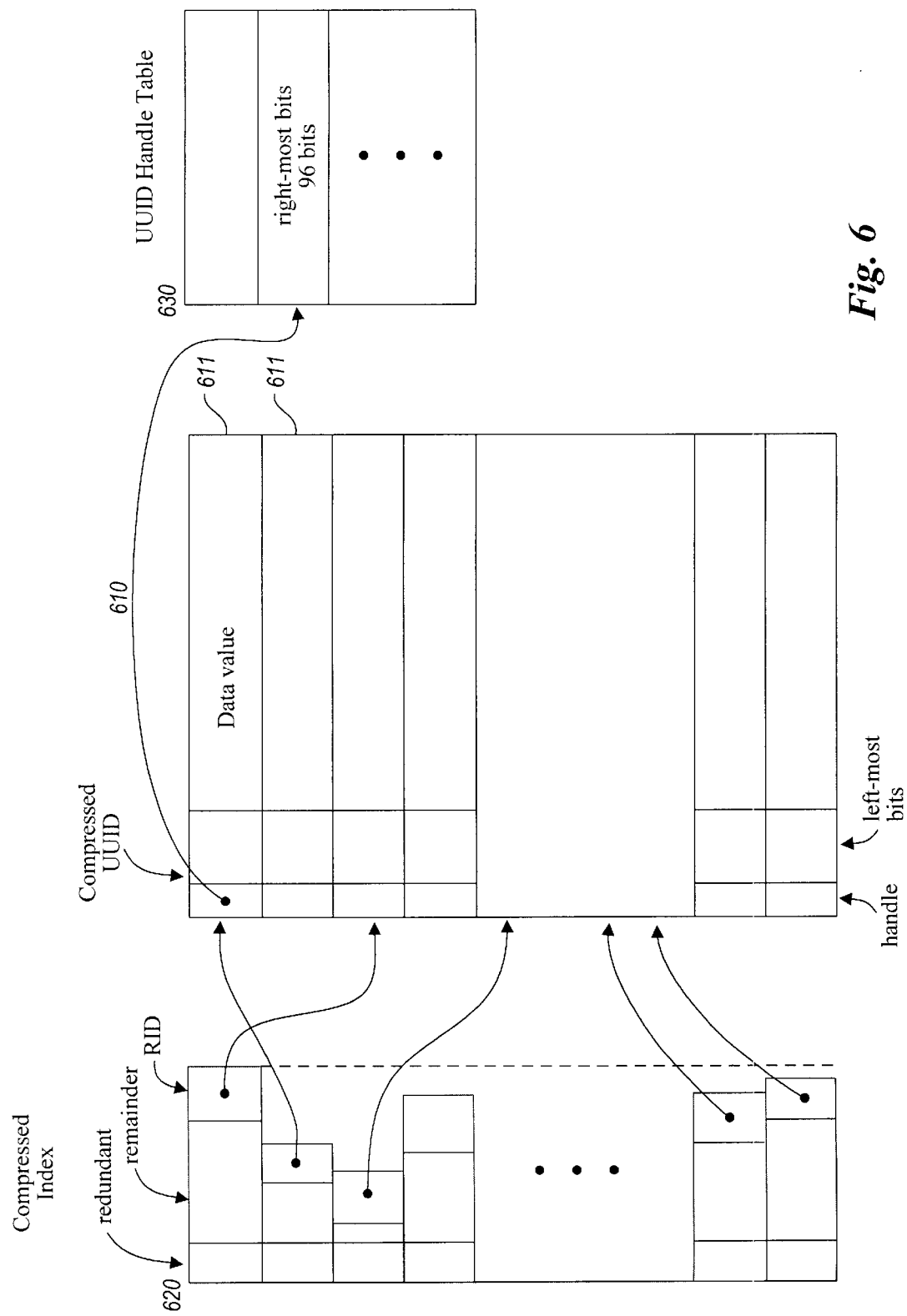
FIG. 6 is a block diagram illustrating a compressed UUID index.

FIG. 6 is a block diagram illustrating a compressed UUID index. A UUID index, as shown in FIG. 3, contains an entry for each row of a database table. Each entry contains the UUID of the row and a row identifier that indicates the location of the row within the table. The entries of the UUID index are preferably sorted based on a right-to-left ordering of bits of the UUIDs. Each row of the database table contains its UUID plus data values. The compressed UUID index 620 contains variable-length entries with three fields: a redundant field, a remainder field, and an RID field. The redundant field indicates the count of bits of the suffix of the UUID of this entry that is redundant with the previous entry in the UUID index. The remainder field contains the bit values for those bits which are not redundant. The RID field contains the row identifier. The compressed UUID index is created by scanning uncompressed UUID index and determining the count of bits of the redundant suffix of adjacent entries. The redundant field of an entry is set to that count. The entries in the compressed UUID index are stored in contiguous memory locations that typically result in a considerable savings in memory usage.

Figure 7:
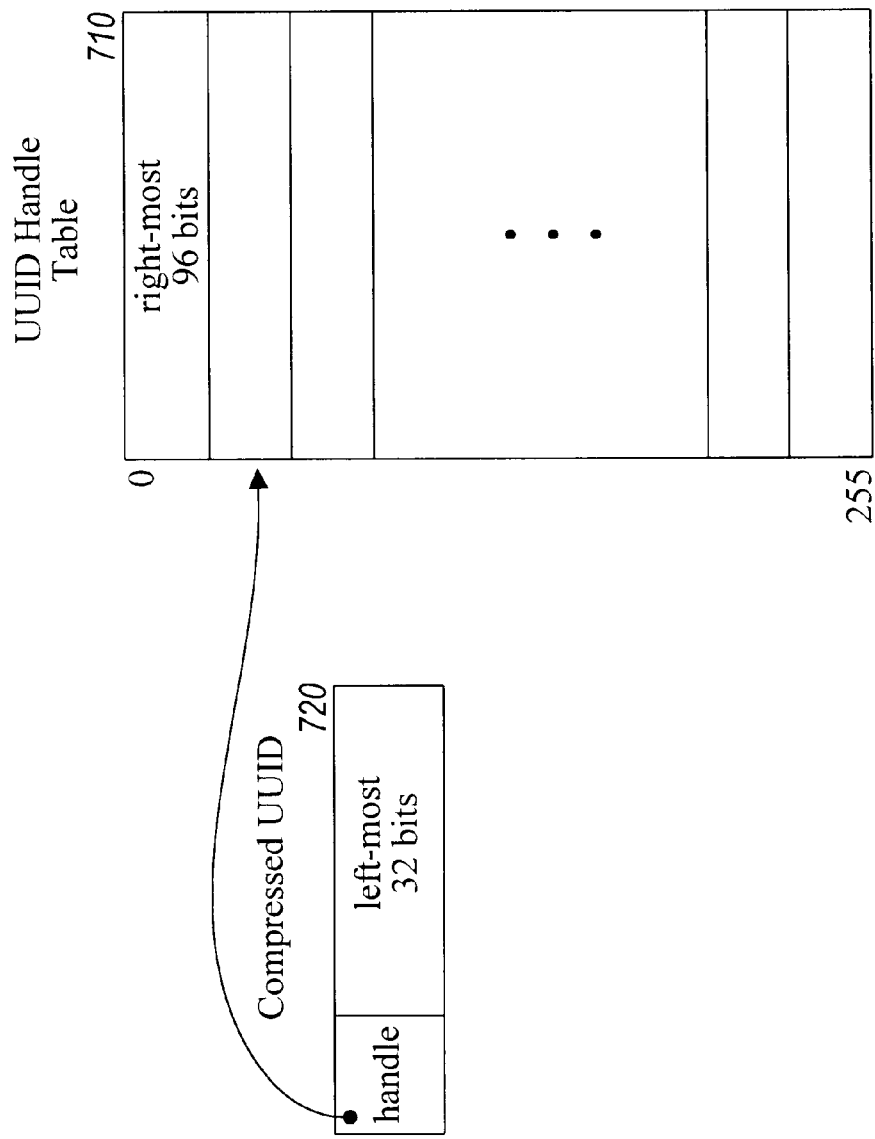
FIG. 7 is a block diagram illustrating the compression of the UUIDs using handles.

FIG. 7 is a block diagram illustrating the compression of the UUIDs using handles. The compression of UUIDs using handles is well-suited for use when the UUIDs are not stored in sorted order or when the UUIDs are not stored in a list. For example, since the rows of the database tables are not stored in sorted order based on the UUIDs, the UUIDs of adjacent rows do not necessarily have long redundant suffixes. Consequently, it may not be beneficial to use a suffix compression of the UUID of a row based on an adjacent row. Also, since rows may be deleted, it may be impractical to compress a UUID based on an adjacent UUID. To compress the UUIDs using handles, the compression system provides a UUID handle table 710. The UUID handle table contains an entry for each unique occurrence of the right 96 bits of a UUID. Thus, the compressed UUIDs can be stored as a handle into the UUID handle table that identifies the right-most 96 bits along with the left-most 32 bits. Assuming the handle is one byte in length (i.e., the UUID handle table has 256 entries), then the total length of the compressed UUID 720 is 5 bytes, or 40 bits. Thus, each row of the database table would have 5 bytes for the compressed UUID, rather than 16 bytes for the uncompressed UUID, resulting in a savings of 11 bytes per row. Referring to FIG. 6, each of the compressed UUIDs in database table 610 contains a handle to the UUID handle table 630. The length of the handle and the number of bits stored in the UUID handle table can be varied based on the characteristics of the UUID being compressed to achieve an optimal compression ratio.

Figure 8:
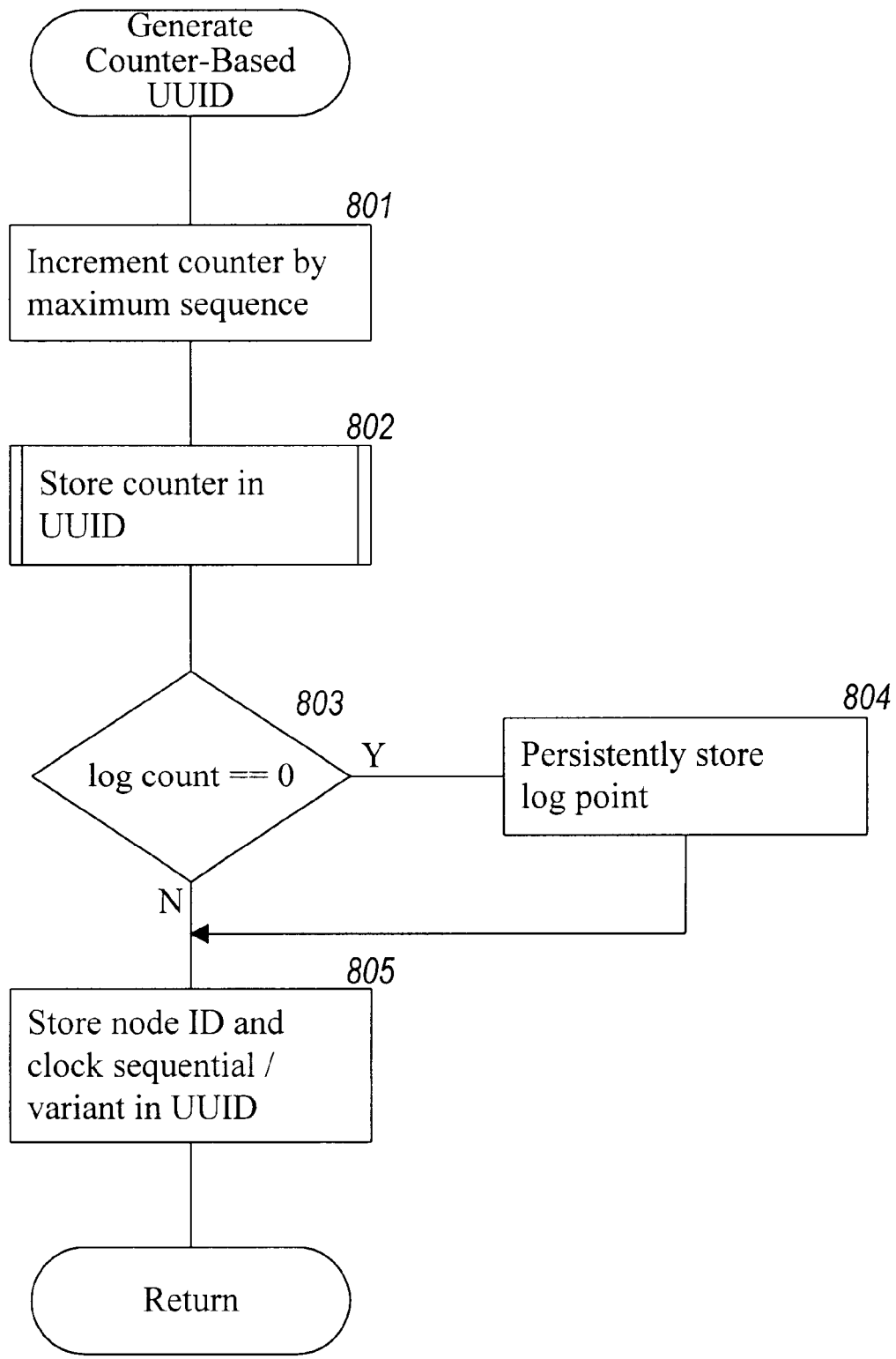
FIG. 8 is a flow diagram of an implementation of a generate counter-based UUID component.

FIG. 8 is a flow diagram of an implementation of a generate counter-based UUID component. The generate counter-based UUID component maintains the actual counter that is incremented each time a UUID is allocated. The component can allocate a range of UUIDs based on the size of the sequence subfield of the actual counter. In step 801, the component increments the actual counter by the number of UUIDs represented by the size of the sequence subfield. For example, if 8 bits are allocated to the sequence subfield, the counter is incremented by 256, which effectively increments the origin part by 1. In step 802, the component stores the actual counter in the counter field of the UUID in reverse order. That is, the actual counter is stored such that the high-order bits of the actual counter are stored in the right-most bits of the counter field. In step 803, if the log count part of the origin subfield and the sequence subfield equal zero, then its time to persistently store the log point and the component continues at step 804, else the component continues at step 805. In step 804, the component persistently stores the actual counter. The entire actual counter is stored, because it can be overwritten when the compression system terminates normally. In this way, after normal termination the compression system can be restarted without skipping UUIDs. In step 805, the component stores the node ID and clock sequential/variant field in the UUID and returns.

When a log point is stored persistently, the component cannot generate a UUID using that log point until the component receives confirmation that the log point was stored successfully. If such a UUID was generated before confirmation was received and the storing failed, then when the component was restarted it would generate a duplicate UUID. However, because the persistent storing of the log point may take a relatively long time, the component may initiate the storing slightly before all the UUIDs for a log point are generated. In this way, the persistent storing can be completed by the time that the log point is incremented and so any delay would be avoided.

In one embodiment, the actual counter may be set to a random value or the clock value when the component is first installed on a computer system, rather than set to 0. The setting to a random value or a clock value helps reduce the possibility that different computer systems will generate duplicate UUIDs. If the node ID field and the clock sequential/variant field are the same for two computer systems, then if each computer system initializes its actual counter to zero, then they will generate duplicate UUIDs. In contrast, if their actual counters are initialized to random values, then it is less likely that they would generate duplicate UUIDs.

Figure 9:
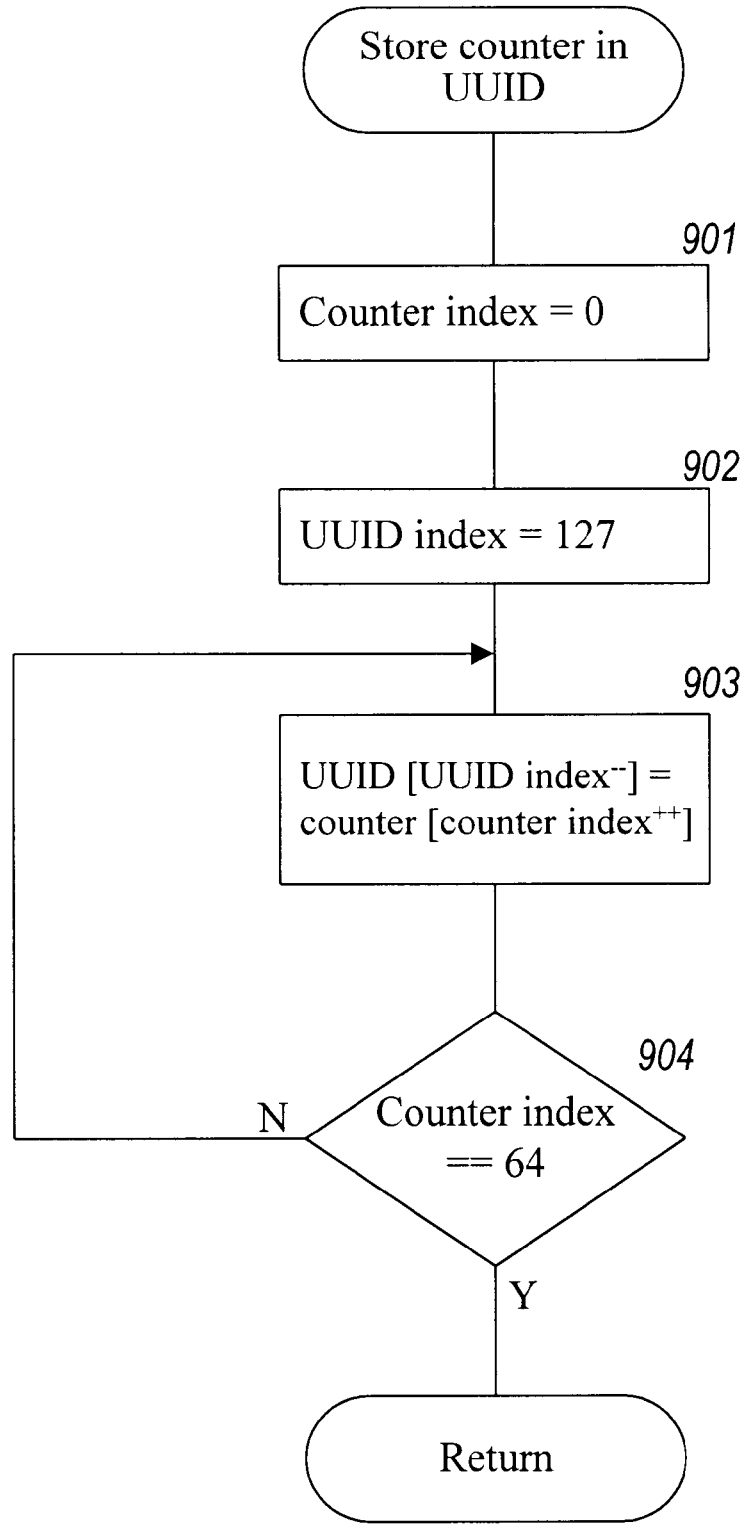
FIG. 9 is a flow diagram of an implementation of a routine to store the actual counter in a UUID.

FIG. 9 is a flow diagram of an implementation of a routine to store the actual counter in a UUID. The routine takes the bits from the actual counter and stores them to the UUID in reverse order. In this way, the high-order bits of the counter are to the right in the UUID. The routine uses two indexes, counter index and UUID index, to copy the bits. In step 901, the routine sets the counter index to 0, which points to the low-order bit of the actual counter. In step 902, the routine sets the UUID index to 127, which points to the left-most bit of the UUID. In steps 903–904, the routine loops, setting the indexed bits of the UUID to the indexed bits of the actual counter. In step 903, the routine sets the bit of the UUID indexed by the UUID index equal to the bit of the actual counter indexed by the counter index. The routine then decrements the UUID index and increments the counter index. This incrementing and decrementing of the indexes effects the reversal of the order of the bits. In step 904, if the counter index equals 64, then all the bits of the actual counter have been copied and the routine returns, else the routine loops to step 903 to move the next bit.

Figure 10:
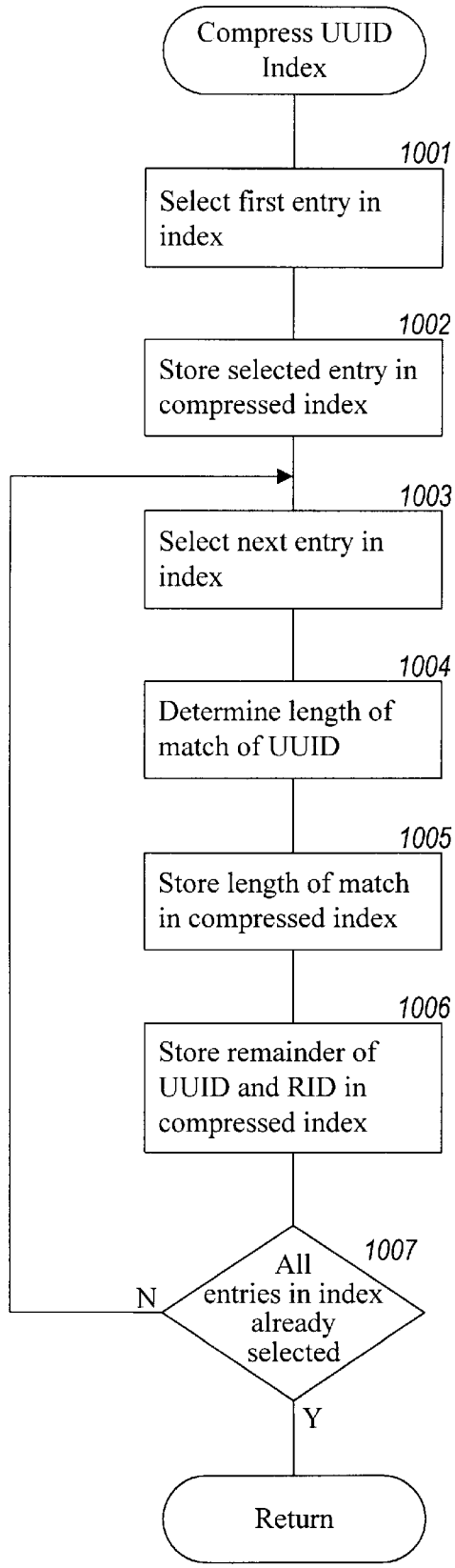
FIG. 10 is a flow diagram of an implementation of a compress UUID index component.

FIG. 10 is a flow diagram of an implementation of a compress UUID index component. The compress UUID index component takes an uncompressed index with entries that contain a UUID and a row identifier, and compresses the UUIDs using suffix compression. In step 1001, the component selects the first entry in the index. In step 1002, the component stores the selected entry in the compressed index with the redundant field set to 0, with the remainder field set to the UUID, and the row ID field set to the row identifier. The first entry in the compressed UUID index contains the entire UUID. In steps 1003–1007, the routine loops selecting each entry in the uncompressed UUID index and compresses the selected entry and stores the compressed entry in the compressed UUID index. In step 1003, the component selects the next entry in the uncompressed UUID index. In step 1004, the component determines the count of bits of the suffix of the UUID of the selected entry that is redundant with the previously selected entry. In step 1005, the component stores the count of bits in the redundant field of the compressed UUID index. In step 1006, the component stores the remainder of the UUID in the remainder field of the compressed UUID index. In step 1007, if all the entries in the uncompressed UUID index have already been selected, then the component returns, else the component loops to step 1007 to select the next entry in the uncompressed UUID index.

Figure 11:
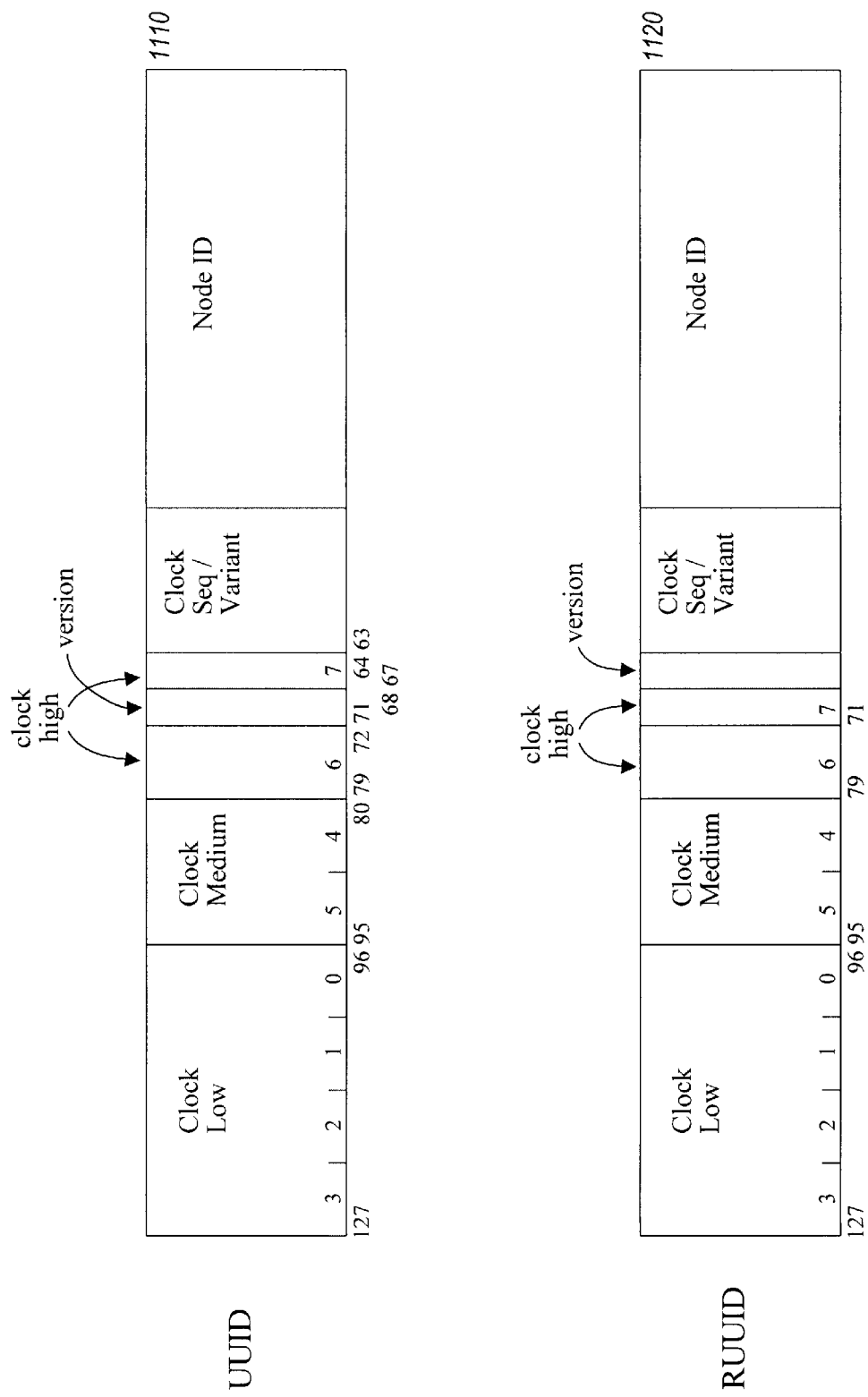
FIG. 11 is a diagram illustrating the rearranging of the bits of the OSF-defined UUID to improve contiguity of redundant information.

FIG. 11 is a diagram illustrating the rearranging of the bits of the OSF-defined UUID to improve contiguity of redundant information. The format 1110 of the standard UUID has the low-order bytes of the clock low subfield stored to the right of the high-order bytes of the clock low subfield. To improve the compressibility, the compression system rearranges the left-most 64 bits of the UUID. In particular, the compression system rearranges the clock high field, the clock medium field, and the clock low field so that the low-order bytes of each clock subfield are to the left of the high-order bytes of the subfield to form the rearranged UUID 1120. The rearranging of the clock field can be at the byte level, as described above, and at the bit level. With byte level rearranging, the low-order bit of each byte is to the right of the high-order bits. Using bit level rearranging, the order of the bits in each byte is also reversed. Bit level rearranging would typically produce higher counts of contiguous, redundant bits.

Figure 12:
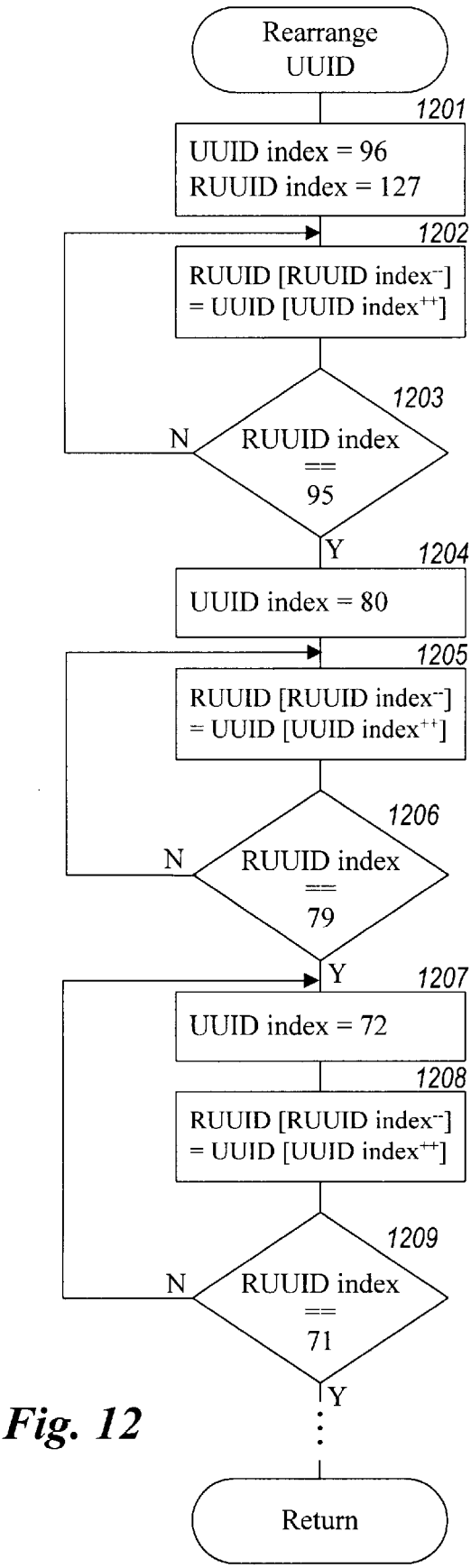
FIG. 12 is a flow diagram of an implementation of a rearrange UUID component.

FIG. 12 is a flow diagram of an implementation of a rearrange UUID component. The component uses a UUID index and an RUUID index to index the bits of the UUID and the rearranged UUID (RUUID), respectively. In steps 1201, the component sets the UUID index equal to 96 and the RUUID index to 127. In steps 1202–1203, the component loops, copying the bits of the clock low subfield of the UUID to the RUUID in rearranged order. For example, bit 96 of the UUID is copied to bit 127 of the RUUID and bit 127 of the UUID is copied to bit 96 of the RUUID. In step 1202, the component copies the indexed bit of the UUID to the indexed bit of the RUUID. The component also decrements the RUUID index and increments the UUID index. In step 1203, if RUUID index equals 95, then all the bits of the clock low subfield have been copied, and the component continues at step 1204 to copy the bits of the clock medium subfield, else the component loops to step 1202 to copy the next bit of the clock low subfield. In step 1204, the component sets the UUID index to 80. In steps 1205–1206, the component loops, copying the bits of the clock medium subfield of the UUID to the RUUID. In step 1205, the component copies the indexed bit of the UUID to the indexed bit of the RUUID. The component then decrements the RUUID index and increments the UUID index. In step 1206, if the RUUID index equals 79, then all the bits of the clock medium subfield have been copied and the component continues at step 1207, else the component loops to step 1205 to continue copying the bits of the clock medium subfield. In step 1207, the component sets the UUID index to 70, which represents the low-order bit of the low-order byte of the clock high subfield. In steps 1208–1209, the component loops, copying the bits of the low-order part of the clock high subfield from the UUID to the RUUID. In step 1208, the component copies the indexed bit of the UUID to the indexed bit of the RUUID and decrements the RUUID index and increments the UUID index. In step 1209, if the RUUID index equals 71, then the component continues to copy the bits of the clock high field and the version field to the RUUID, else the component loops to step 1208 to copy the next bit of the lower part of the clock high field. The additional processing is represented by the ellipsis.

Although the present invention has been described in terms of a preferred embodiment, it is not intended that the invention be limited to these embodiments. Modifications within the spirit of the invention will be apparent to those skilled in the art. For example, the ordering of the bits of the UUIDs can be reversed and a prefix compression, rather than a suffix compression can be used. The scope of the present invention is defined by the claims that follow.

We claim:

1. A method in a computer system for generating a plurality of universally unique identifiers (UUIDs), each UUID having bits being ordered from left to right, the method comprising:

for each of the plurality of UUIDs,
  incrementing a counter having bits being ordered from a high-order bit to a low-order bit;
  setting the right-most bits of the UUID to a node identifier;
  setting the next right-most bits of the UUID to a clock sequential/variant value; and
  setting the left-most bits of the UUID to the bits of the counter wherein the left-most bit of the UUID is set to the lowest-order bit of the counter so that sequentially generated UUIDs tend to have the same values in their right-most bits.

2. The method of claim 1, including:
determining whether the counter has been incremented a certain number of times; and
when the counter has been incremented that certain number of times, storing an indication of bits of the counter on persistent storage.

3. The method of claim 2, including:
when initializing the generating of the UUIDs, retrieving the indication of the bits of the counter from persistent storage; and
setting the bits of the counter based on the retrieved indication so that duplicate UUIDs are not generated.

4. The method of claim 1, including initially setting the counter to a random value to reduce a possibility that different computer systems will generate duplicate UUIDs.

5. The method of claim 1 including initially setting the counter to a clock value.

6. The method of claim 1 wherein the clock sequential/variant value has a clock sequence value that is set to a random value used in all UUIDs generated by the computer system.

7. A method in a computer system for compressing a plurality of universally unique identifiers (UUIDs), the method comprising:
for each of the plurality of UUIDs,
selecting the UUID;
determining a portion of the selected UUID that is redundant with a portion of a previously selected UUID;
storing an indication of the portion of the selected UUID that is redundant; and
storing a remainder of the selected UUID that is not indicated as being redundant.

8. The method of claim 7 wherein the UUIDs are arranged in a sorted order.

9. The method of claim 8 wherein the sorting is based on a right-to-left ordering of bits in the UUIDs.

10. The method of claim 7 wherein the UUIDs are in an index.

11. The method of claim 7 wherein the UUIDs have bits and the bits have been rearranged to improve contiguity of redundant bits.

12. The method of claim 7 wherein the UUIDs are arranged from a first to a last and the UUIDs are selected in order from the first to the last.

13. The method of claim 7 wherein the stored indication is the number of bits of the UUIDs that are redundant.

14. The method of claim 13 wherein the redundant portions are contiguous bits of the UUIDs.

15. The method of claim 7 wherein the UUIDs have a OSF-defined format.

16. The method of claim 15 wherein the bits of the UUID are rearranged to improve contiguity of the redundant portion.

17. The method of claim 15 wherein the redundant portions are a right-most portion of the UUIDs.

18. The method of claim 7 wherein the UUIDs have a counter-based format.

19. A method in a computer system for storing a plurality of universally unique identifiers (UUIDs), each UUID having a node identifier and a clock value, the clock value having bits ranging from a lowest-order bit to a highest-order bit, the method comprising:
for each of the plurality of UUIDs,
selecting the UUID;
rearranging the bits of the selected UUID in a predefined manner so that the lowest-order bits of the clock value are farther away from the node identifier than the highest-order bits of the clock value;
determining a portion of contiguous bits of the rearranged UUID that is redundant with a previously rearranged UUID;
storing an indication of a count of the bits of the rearranged UUIDs that are in the redundant portion; and
storing the bits of the rearranged UUID not indicated by stored indication.

20. The method of claim 19 wherein the UUIDs are in a list.

21. The method of claim 20 wherein the list is sorted by UUID.

22. The method of claim 19 wherein the list is an index.

23. The method of claim 19 wherein the UUIDs have an OSF-defined format.

24. A method in a computer system of storing object identifiers, the method comprising:
generating a mapping of handles to values of a portion of object identifiers;
receiving an object identifier;
determining whether the value corresponding to the portion of the received object identifier is in the generated mapping; and
when the value corresponding to the portion of the received object identifier is in the generated mapping, setting a compressed form of the received object identifier to a combination of the handle that maps to that value and of the remainder of the received object identifier other than the value.

25. The method of claim 24 wherein the received object identifier is the universally unique identifier (UUID).

26. The method of claim 24, including:
when the value corresponding to the portion of the received object identifier is not in the generated mapping, adding the value to the generated mapping; and
setting a compressed form of the received object identifier to a combination of the handle that maps to that value and of the remainder of the received object identifier other than the value.

27. A method in a computer system of generating a universally unique identifier (UUID) that is different from another UUID, the UUIDs being in an established standard format that defines a clock value relative to a predefined starting date, the clock value indicating time of generation of a UUID, by setting the clock value in the generated UUID to a time that pre-dates established standard so that the generated UUID can not be a duplicate of any UUID generated with its clock value set to its time of generation.

28. A method in a computer system for generating a plurality of identifiers, the method comprising:
for each of the plurality of identifiers,
incrementing a counter having bits being ordered from a high-order bit to a low-order bit;
setting a computer system identifier portion of contiguous bits of the identifier to identify the computer system that is generating the identifier; and
setting a counter portion of contiguous bits of the identifier to the bits of the counter wherein bits of the counter portion that are closer to the bits of the computer system identifier portion are set to the higher-order bits of the counter.

29. The method of claim 28, including:
determining whether the counter has been incremented a certain number of times; and
when the counter has been incremented that certain number of times, storing an indication of bits of the counter on persistent storage.

30. The method of claim 29, including:
when initializing the generating of the identifier, retrieving the indication of the bits of the counter from persistent storage; and setting the bits of the counter based on the retrieved indication so that duplicate identifiers are not generated.

31. The method of claim 28, including initially setting the counter to a random value to reduce the possibility that different computer systems will generate duplicate identifiers.

32. The method of claim 28, including initially setting the counter to a clock value.

33. The method of claim 28 wherein the identifier is a universally unique identifier (UUID).

34. A method in a computer system for locating a universally unique identifier (UUID) in a list of compressed UUIDs, each compressed UUID indicating a number of bits that are redundant with a previous UUID and having a value of bits that are not indicated as redundant, the method comprising:
    receiving the UUID to be located;
    selecting the first compressed UUID in the list;
    determining whether the UUID of selected compressed UUID is the same as the received UUID; and
    repeating the following until the selected UUID is the same as the received UUID,
        selecting the next compressed UUID in the list; and
        determining whether the UUID for the selected compressed UUID is the same as the received UUID based on the indication of the number of bits redundant with a previously selected UUID and the value of the bits that are not indicated as redundant.

35. A computer-readable medium containing instructions for causing a computer system to compress a plurality of object identifiers, by:
    selecting each object identifier;
    determining a portion of the selected object identifier that is redundant with a portion of a previously selected object identifier;
    storing an indication of the portion of the selected object identifier that is redundant; and
    storing a remainder of the selected object identifier that is not indicated as being redundant.

36. The computer-readable medium of claim 35 wherein the object identifiers are arranged in a sorted order.

37. The computer-readable medium of claim 36 wherein object identifiers are universally unique identifiers (UUIDs) and the sorting is based on a right-to-left ordering of bits in the UUIDs.

38. The computer-readable medium of claim 35 wherein the object identifiers are in an index.

39. The computer-readable medium of claim 35 wherein the object identifiers have bits and the bits have been rearranged to improve contiguity of redundant bits.

40. The computer-readable medium of claim 35 wherein the object identifiers are arranged from a first to a last and the object identifiers are selected in order from the first to the last.

41. The computer-readable medium of claim 35 wherein the stored indication is the number of bits of the object identifiers that are redundant.

42. The computer-readable medium of claim 41 wherein the redundant portions are contiguous bits of the object identifiers.

43. The computer-readable medium of claim 35 wherein the object identifiers are universally unique identifiers (UUIDs) and have a OSF-defined format.

44. The computer-readable medium of claim 43 wherein the bits of the UUID are rearranged to improve contiguity of the redundant portion.

45. The computer-readable medium of claim 43 wherein the redundant portions are a right-most portion of the UUIDs.

46. The computer-readable medium of claim 35 wherein the object identifiers have a counter-based format.

47. A computer-readable medium containing instructions for causing a computer system to generate identifiers, by:
    incrementing a counter having bits being ordered from a high-order bit to a low-order bit;
    setting a computer system identifier portion of contiguous bits of the identifier to identify the computer system that is generating the identifier; and
    setting a counter portion of contiguous bits of the identifier to the bits of the counter wherein bits of the counter portion that are closer to the bits of the computer system identifier portion are set to the higher-order bits of the counter.

48. The computer-readable medium of claim 47, including:
    determining whether the counter has been incremented a certain number of times; and
    when the counter has been incremented that certain number of times, storing an indication of bits of the counter on persistent storage.

49. The computer-readable medium of claim 48, including:
    when initializing the generating of the identifier, retrieving the indication of the bits of the counter from persistent storage; and
    setting the bits of the counter based on the retrieved indication so that duplicate identifiers are not generated.

50. The computer-readable medium of claim 47, including initially setting the counter to a random value to reduce the possibility that different computer systems will generate duplicate identifiers.

51. The computer-readable medium of claim 47, including initially setting the counter to a clock value.

52. The computer-readable medium of claim 47 wherein the identifier is a universally unique identifier (UUID).

53. A computer-readable medium containing instructions for causing a computer system to store object identifiers, by:
    generating a mapping of handles to values of a portion of object identifiers;
    determining whether the value corresponding to the portion of an object identifier is in the generated mapping; and
    when the value corresponding to the portion of the object identifier is in the generated mapping, setting a compressed form of the object identifier to a combination of the handle that maps to that value and of the remainder of the object identifier other than the value.

54. The computer-readable medium of claim 53 wherein the object identifiers are the universally unique identifier (UUID).

55. The computer-readable medium of claim 53, including:
    when the value corresponding to the portion of the object identifier is not in the generated mapping, adding the value to the generated mapping; and
    setting a compressed form of the object identifier to a combination of the handle that maps to that value and of the remainder of the object identifier other than the value.

56. A computer system for generating a plurality of identifiers, comprising a counter-based identifier component that increments a counter having bits being ordered from a high-order bit to a low-order bit that sets a computer system identifier portion of contiguous bits of the identifier to identify the computer system that is generating the identifier, and that sets a counter portion of contiguous bits of the identifier to the bits of the counter wherein bits of counter portion that are closer to the bits of the computer system identifier portion are set to the higher-order bits of the counter.

57. The system of claim 56 wherein the component further determines whether the counter has been incremented a certain number of times, and when the counter has been incremented that certain number of times, storing an indication of bits of the counter on persistent storage.

58. The system of claim 57 wherein the component further retrieves the indication of the bits of the counter from persistent storage when initializing the generating of the identifier, and sets the bits of the counter based on the retrieved indication so that duplicate identifiers are not generated.

59. The system of claim 56 wherein the component initially sets the counter to a random value to reduce the possibility that different computer systems will generate duplicate identifiers.

60. The system of claim 56 wherein the component initially sets the counter to a clock value.

61. The system of claim 56 wherein the identifier is a universally unique identifier (UUID).

62. A computer system for storing object identifiers, comprising:

a mapping of handles to values of a portion of object identifiers; and a component that determines whether the value corresponding to the portion of the object identifier is in the mapping, and when the value corresponding to the portion of the object identifier is in the mapping, sets a compressed form of the object identifier to a combination of the handle that maps to that value and of the remainder of the object identifier other than the value.

63. The system of claim 62 wherein the object identifier is the universally unique identifier (UUID).

64. The system of claim 62 wherein the component further adds the value to the mapping, when the value corresponding to the portion of the object identifier is not in the mapping, and sets a compressed form of the object identifier to a combination of the handle that maps to that value and of the remainder of the object identifier other than the value.

* * * * *